Patented July 26, 1932

1,869,087

UNITED STATES PATENT OFFICE

ABRAHAM S. BEHRMAN, OF CHICAGO, ILLINOIS, ASSIGNOR, BY MESNE ASSIGNMENTS, TO THE PERMUTIT COMPANY, OF NEW YORK, N. Y., A CORPORATION OF DELAWARE

BASE EXCHANGE MATERIAL AND METHOD OF PREPARING SAME

No Drawing.   Application filed April 24, 1924.   Serial No. 708,672.

The present invention relates to the preparation of zeolites or base exchange silicates, especially those useful for the softening of water, and provides an improvement in that class of zeolites formed by the reaction of alkaline solutions of amphoteric hydroxides with alkali metal silicates.

There have been several methods proposed for, and followed in, the preparation of base exchange materials by the reaction between solutions of sodium aluminate and sodium silicate, the first of which was probably by Way, published in 1852 in the Journal of the Royal Agricultural Society, Vol. 13, p. 123.

Zeolites produced by these reactions have generally had comparatively high capacity for softening water, but because of the fact that both of the solutions are alkaline, great difficulty has been experienced in producing an end product having the physical characteristics, viz. hardness, strength, stability and density, requisite for successful employment in industrial use. A characteristic reaction caused by mixture of these two solutions, not showing the water content, is as follows:

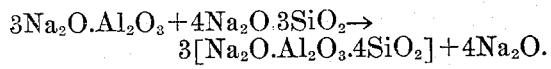

From this it is to be observed that one molecule of free alkali is liberated for each molecule of sodium silicate employed, the resulting large proportion of free alkali to be taken care of constituting the chief difficulty in preparing by this method base exchange materials which are commercially practicable. Furthermore, sodium aluminate commonly contains from 50% to 100%, or more, of caustic alkali in excess of what is required theoretically to combine with the alumina, and this excess which is present in the mother liquor of the reaction mixture must also be disposed of.

It has long been recognized that, unless a substantial portion of this free alkali is removed from the precipitate before drying, the dried end-product would tend to crumble and powder, particularly on re-wetting. As a consequence, all prior methods for the preparation of base exchange materials from these reagents contemplate the removal of the free alkali and the mother liquor before drying, this removal having been effected by washing, filter pressing or the like. As an aid to removal, very dilute solutions of the reagents have been employed. Working under such conditions involves the use of more or less extensive and elaborate apparatus, requires long periods of time for treatment and otherwise adds heavily to the cost of preparation. Even under the most favorable conditions, materials produced according to any of the prior processes have a relatively low density, only slight physical strength, and poor resistance against attrition. The result is that relatively large volumes of the materials must be employed to accomplish the rated exchange, and replacements are frequent. With some materials it is necessary that they be kept saturated at all times, which is inconvenient, expensive, and a serious handicap in shipping and handling the product.

The principal objects of the present invention are to provide a method for preparing base exchange materials by the reaction of sodium aluminate on sodium silicate, or from equivalent materials, in which the mechanical removal of free alkali is obviated, to simplify the procedure, reduce the time and equipment required for the reaction and subsequent steps, and to produce a material of higher base exchange capacity, of greater hardness, stability, strength and density and in every other way more desirable and efficient than products hitherto prepared from these reagents according to any of the prior methods.

These objects are attained by adding to the reagents sufficient acid to neutralize a substantial portion of the alkali in the reaction mixture. The acid may be added at any stage in the process. It may be added at the moment the solutions are mixed or it may be added just before complete drying of the product, or it may be added at any time or stage in between. I find it is preferable to add the acid while the mixture of the two solutions is still fluid, and, although the use of concentrated solutions is favored, the degree of concentration should be such that a reasonable amount of time is permitted for intimate mixing prior to the setting of the gel. Of course, many of the advantages of the invention may be realized by using more dilute solutions, but I prefer to employ the alkaline solutions in such degree of concentration that soon after the acid is added the whole reaction mass sets to a stiff, firm gel occupying the entire volume of the mixture. In this case there is practically no separation of mother liquor.

For an example of the process which will produce the improved product of the invention, I cite the following:

10 liters of commercial waterglass solution (sodium silicate—40° Baumé) containing about 9% $Na_2O$ and 28.5% $SiO_2$ which will amount to about 20 moles of $Na_2O$ and 66 moles of $SiO_2$ or about 20 moles of a silicate having the approximate formula $Na_2O(SiO_2)3.27$ are diluted to 50 liters and cooled to about 5° C. To this solution there is added 24 liters of a 10% solution of sodium aluminate, containing about 30.4 g. $Na_2O$ and 21.5 g. $Al_2O_3$ per liter which will contain about 12 moles of $Na_2O$ and 5 moles of $Al_2O_3$, or about 12 moles of an aluminate having the approximate formula $$Na_2O(Al_2O_3)0.43,$$

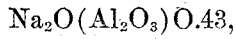

and the two are mixed thoroughly. The sodium aluminate should also be cooled to about 5° C. prior to mixing. While the mixture is still liquid add 15 liters of dilute sulphuric acid, containing about 175 g. $H_2SO_4$ per liter, a total of about 27 moles of sulphuric acid or 54 gram-atoms of hydrogen ions, preferably previously cooled, and continue to mix thoroughly. After neutralization of the acid there will remain about 5 moles of $Na_2O$, 5 moles of $Al_2O_3$ and 66 moles of $SiO_2$ to react together to form the base exchange silicate, which will have a high silica content. In a minute or less the mixture will lose its fluidity and resolve itself into a firm, stiff gel embracing the entire volume of the reaction mixture. This mixture will react alkaline to the phenolphthalein class of indicators. As soon as the gel is thoroughly set, it may be dried completely at any temperature under 100° C. When it becomes bone dry it will fall apart in small hard lumps. Upon wetting, these lumps will granulate into small, hard, transparent, glassy particles of suitable size for use in the softening of water. The dried particles have an apparent density of about 50 lbs. per cubic foot and a base exchange capacity of about 225 grains per pound, calcium carbonate equivalent. They will not disintegrate under the influence of water or the common regenerating brine, and they may be transported dry and handled the same as other zeolites of different classification.

The material prepared in accordance with the example cited, is highly porous, due in part to the large quantity of soluble salts retained in the reaction mixture after complete drying, and removed by the subsequent leaching. It has value as an adsorbent entirely aside from its base exchanging properties. The solutions of sodium aluminate and sodium silicate in the above example are so proportioned and are of such concentration and composition that a solid product or precipitate will form from the admixed solutions without the addition of the sulphuric acid.

While the foregoing represents what I consider to be a preferred method of treatment, variations and modifications in the materials, proportions, degrees of concentration, times, temperatures, etc. are permissible and are contemplated within the scope of the invention. For instance, the proportions of the reagents may be altered to vary the degree of alkalinity in the end-mixture or the quantity of added acid may be increased to an extent which will render the end mixture neutral to phenolphthalein, but alkaline to methyl orange. A mixture so prepared will also be industrially satisfactory, possessing great mechanical strength and hardness, having a high base exchange capacity and a slightly greater apparent density than the product of the example cited.

The silica content may be increased by the use of additional quantities of sodium silicate and acid in accordance with the disclosure of my co-pending application, Serial No. 700,822, filed March 21, 1924. The end-product, either before or after final drying, may be treated with a solution of an alkali metal hydroxide, carbonate or bicarbonate to further increase the replaceable alkali metal content.

The advantage in the use of the low temperatures specified is that a smoother gel is formed, less water need be employed, and it is possible to preserve the fluid state of the mixture longer than at normal room temperatures, thus giving a better opportunity for thorough mixing. But, of course, the reaction will take place at higher temperatures, and, while it is preferable to use the solutions in such degree of concentration that the gel formed occupies the entire reaction volume, it is also possible to obtain a desirable end-product by the employment of more dilute solutions, and, if desired, the mother liquor may be separated.

Potassium silicate may be substituted for sodium silicate, or a mixture of the two may be used; an alkaline solution of any equivalent amphoteric hydroxide may be employed instead of the sodium aluminate; the proportions of alkali and alumina in the sodium aluminate may vary from that cited in the example, and other alternatives may be resorted to, to meet any particular condition, requirement or fancy.

Solutions of other amphoteric hydroxides have been disclosed in the prior art as equivalents of sodium aluminate in this process. The patent to Boehringer 1,050,204, dated January 14, 1923, discloses that soluble alkali salts of the hydroxides of lead, zinc or tin will react with an alkali metal silicate to form a base exchange silicate. The German Patent 300,209 to the Permutit Corporation issued August 21st, 1917, discloses that alkali salts of chromium, tungsten and vanadian can also be used for this purpose. These compounds can be broadly referred to as solutions of amphoteric metal hydroxides.

The present invention is in a sense an improvement over the subject matter of the prior patent to Behrman, No. 1,515,007, granted November 11, 1924. In this prior patent a solution of an amphoteric metal hydroxide is reacted with a solution of sodium silicate to form a gel material, which as formed embraces substantially all or a major portion of the reaction mixture. The present invention when applied to the process and product of that patent improves it by adding an acid or acid material to neutralize or combine with a substantial portion, a major portion or substantially all of the excess alkali contained in the reaction mixture.

I claim:

1. The process of preparing a metallo-silicate which comprises mixing an alkaline solution of an amphoteric hydroxide with an alkali metal silicate solution and adding sufficient acid to neutralize substantially all of the free alkali of the reaction mixture.

2. The process of preparing metallo-silicates, which comprises reacting together an alkali metal silicate and an alkali metal amphoterate and neutralizing about five-sixths of the alkali metal oxide present.

3. In the process of preparing a base exchange material the step of treating the said material with a sufficient amount of an acid to neutralize substantially all the free alkali in the material.

In testimony whereof I have hereunto subscribed my name.

ABRAHAM S. BEHRMAN.